June 30, 1931. O. N. GREDELL 1,812,093
TRUCK TANK MOUNTING
Filed March 27, 1929 3 Sheets-Sheet 1

INVENTOR
Otto N. Gredell
BY
Arthur C. Brown
ATTORNEY

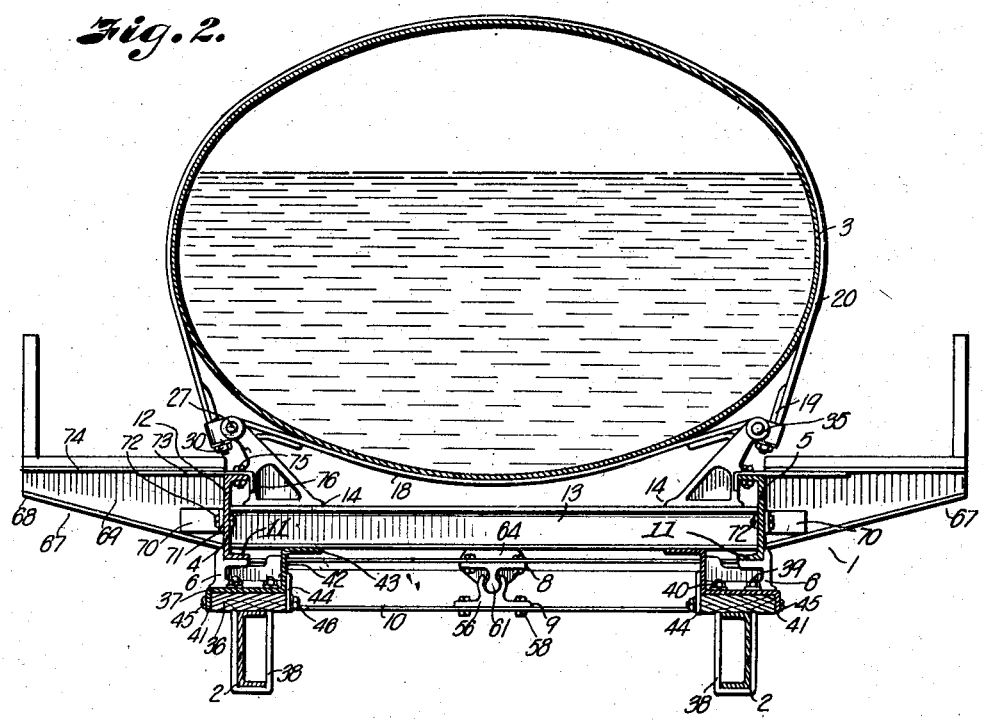

June 30, 1931.    O. N. GREDELL    1,812,093
TRUCK TANK MOUNTING
Filed March 27, 1929    3 Sheets-Sheet 3
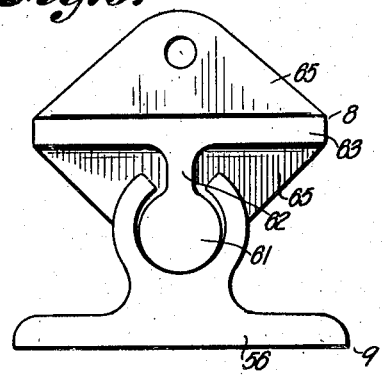
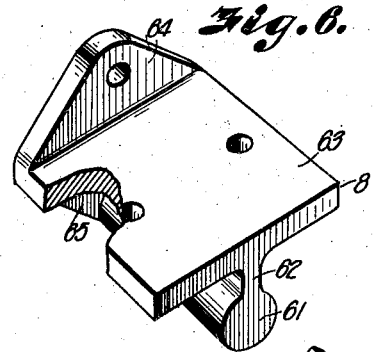
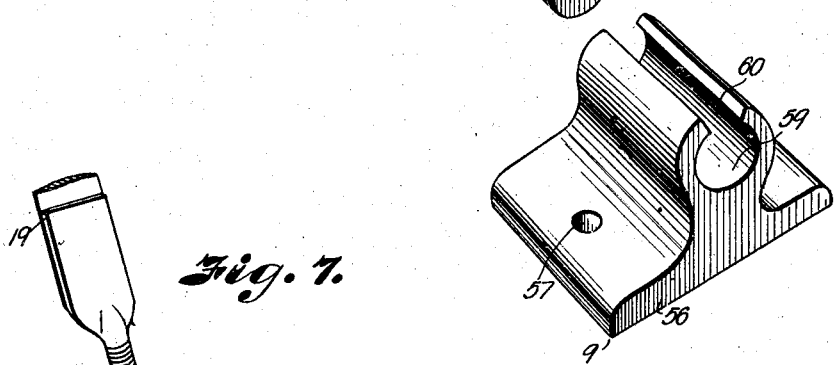
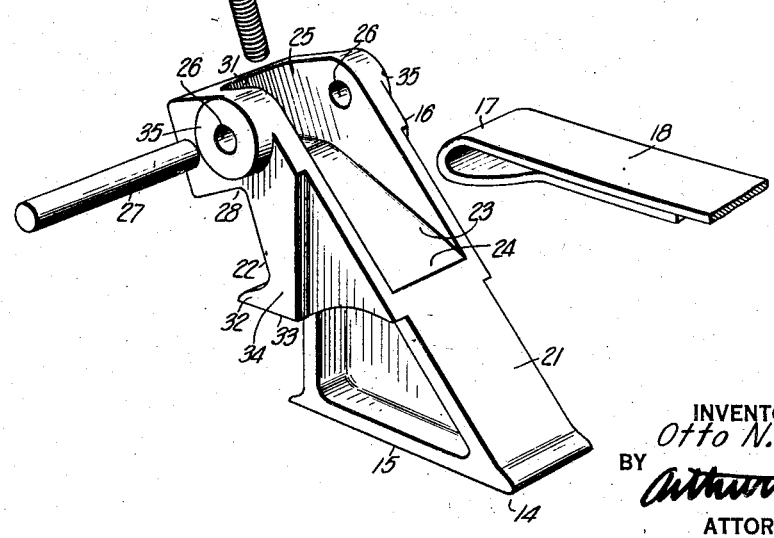
INVENTOR
Otto N. Gredell
BY Arthur E. Brown
ATTORNEY Patented June 30, 1931

1,812,093

UNITED STATES PATENT OFFICE

OTTO N. GREDELL, OF KANSAS CITY, MISSOURI, ASSIGNOR TO STANDARD STEEL WORKS, OF NORTH KANSAS CITY, MISSOURI, A CORPORATION OF MISSOURI

TRUCK TANK MOUNTING

Application filed March 27, 1929. Serial No. 350,209.

My invention relates to truck tanks and more particularly to truck tank mountings, the principal objects of the invention being to effect the mounting of a tank on a truck with its center of gravity at a minimum elevation above the truck frame, to minimize transmission of road shocks to the tank, and to provide relatively strong three point mounting elements adapted to support a tank in such a manner that the tank will not be subject to distortion strains when the frame of the truck and mounting elements are distorted.

In accomplishing these and other objects of the invention, I have provided improved details of structure, the preferred forms of which are illustrated in the accompanying drawings, wherein:

Fig. 2 is a vertical cross section on the line 2—2, Fig. 1.

Fig. 3 is an enlarged section of one of the brackets mounted at the sides of the tank to receive saddle straps for supporting the tank.

Fig. 4 is an enlarged detail perspective view of a bracket-like block adapted for mounting on a chassis for supporting a supplemental sill whereby the tank supporting brackets are supported.

Fig. 5 is an enlarged rear elevation of a chassis supported socket and a pivot bar member movably mounted in the socket and adapted to be secured to the front end of the tank.

Fig. 6 is a perspective view of the socket and pivot bar member in disassembled position, part of a pivot member wall being broken away to better illustrate a stop wall against which the socket is adapted to abut.

Fig. 7 is an enlarged perspective view of the bracket shown in Fig. 3, a pivot member and portions of a saddle strap and tank stabilizing band being shown in spaced relation for better illustration.

Figure 1:
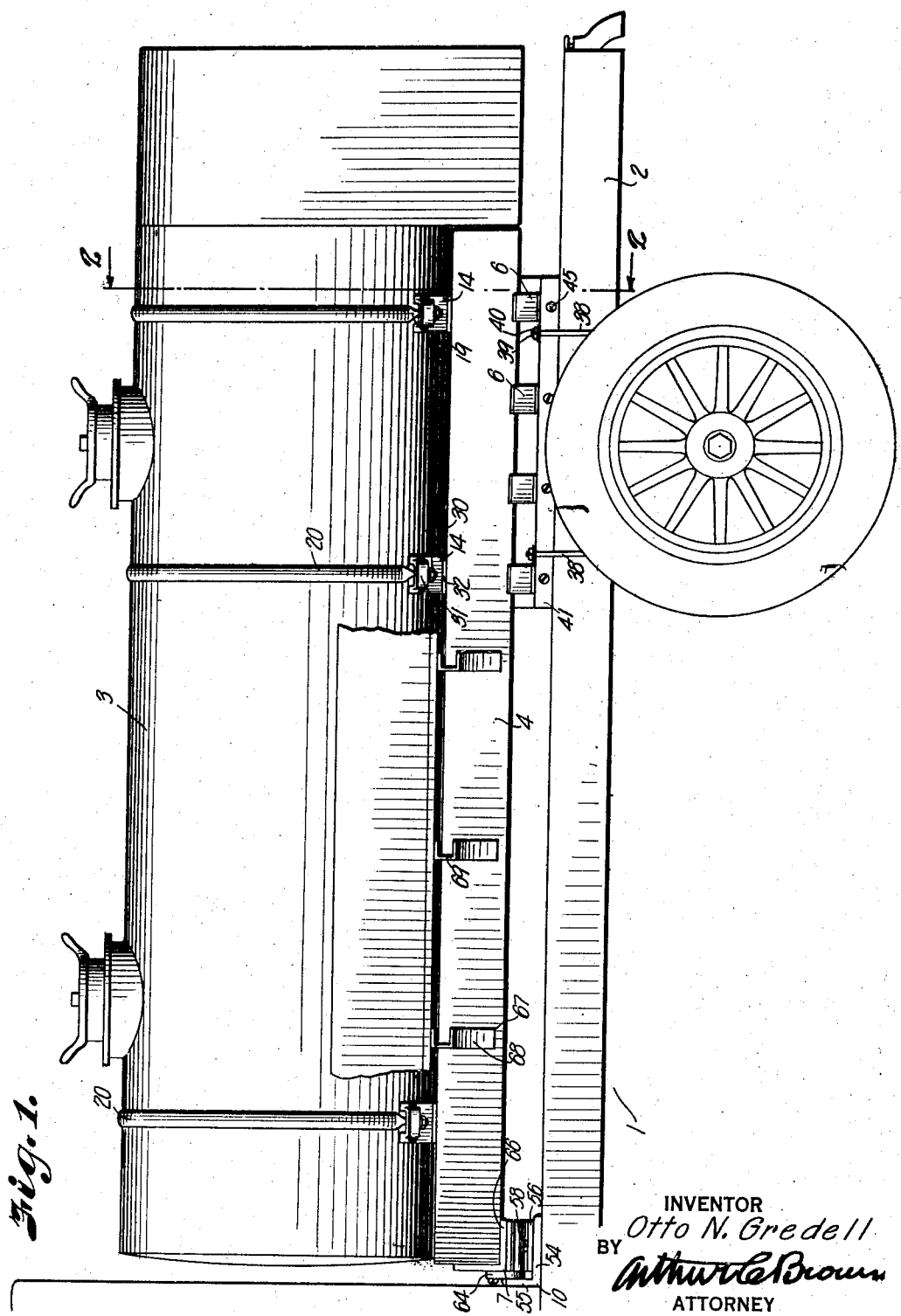
Fig. 1 is a side elevation of the rear portion of a motor truck and a motor tank supported thereon by my improved mounting, portions of a can rack being broken away to better disclose mounting elements.

Referring in detail to the drawings:

1 designates generally a motor truck chassis including parallel longitudinal sills 2 comprising channel members positioned edgewise, and 3 a horizontally enlongated tank adapted to be mounted on the chassis with its longitudinal middle line in the vertical plane of the median line of the chassis.

I preferably provide a pair of supplemental sills 4 and 5 mounted on a plurality of blocks 6 supported by the chassis sills adjacent the rear end thereof, the front ends of the sills being secured to a cross member 7 provided with a depending central pivot bar member 8 movably mounted in a socket 9 supported by a cross member 10 having ends secured to the chassis sills, details of the mounting and the several parts thereof to be later particularly described.

The supplemental sills 4 and 5 preferably comprise channel members supported edgewise by the chassis sills with their flanges 11 directed toward the middle line of the chassis, and so positioned that their web portions 12 stand adjacent and preferably spaced outwardly from the outer edges of the chassis sills.

Bolster-like cross sill members 13 are located at selected positions along the chassis and in three positions in the structure illustrated in Fig. 1, preferably comprising I-beams secured to the channel-like supplemental sills and having their end edges welded to the inner faces of the web portions 12 of said sills.

Mounted on each of said transverse members 13 adjacent the ends thereof are pairs of transversely spaced pedestal-like brackets 14 comprising relatively long horizontal base portions 15 having lower faces engaging the upper surfaces of the cross members 13 and secured thereto, for example by welding. The brackets further comprise outwardly laterally projecting arm portions 16 adapted to receive looped ends 17 of saddle strap members 18 for suspendingly supporting the tank, and also to receive strap bolts comprising end members 19 of bands 20 adapted to engage the upper portion of the periphery of the tank for anchoring the engaged tank portions to the saddle straps.

The brackets have inclined inner and outer edges or faces 21 and 22, and are further provided with grooves or slots 23 on their inner faces having downwardly inwardly inclined floors 24 and forming ear-like vertical parallel walls 25 which are provided with aligned openings 26 to receive pins 27 adapted to extend through loops 17 of saddle straps 18 for pivotally mounting the ends of the saddle straps on the brackets.

Extending outwardly and preferably at a slight downward angle from the inclined outer faces 22 of the brackets at the upper ends thereof are lugs 28 having openings 29 to admit the strap bolts 19 on which nuts 30 may be screwthreaded to anchor the bands to the brackets.

The ears 25 are preferably extended laterally from the brackets to provide side wall guides for the bolts 19 and are connected at their outer ends by a wall 31, the ears and walls forming guides for the bolts and reinforcing the lugs 28.

The openings 29 are formed larger than necessary to receive the bolts, so that there may be a slight latitude for mounting the bolts in the openings.

The slanting floor of each groove 23 is spaced sufficiently from the pin-receiving opening and extends at suitable inclination to permit mounting of the backbent extremity of a strap forming the loop 17 to depend without substantially engaging the bottom of the groove when the strap is deflected downwardly due to the weight of the tank and its contents.

Each bracket is further provided with a lateral lip-like shoulder or ledge 32 having a lower face 33 substantially parallel with the cross bar engaging bottom surface of the bracket. The shoulder is suitably positioned on the bracket and the cross bar is so secured to the supplemental sill that the shoulder overlies the upper flange of the channel-like sill and serves to brace and reinforce the bracket.

The shoulder member 32 further comprises reinforcing portions 34 extending from the sides of the bracket and the sidewise projecting enlargements preferably extend upwardly to provide thickened portions of the ear members 25 and extensions of said ear members for stiffening and reinforcing the outwardly projecting and inclined arm of the bracket.

Bosses 35 are further formed on the outer faces of said ear portions at the openings for additional bearing support for the pin 27.

The shoulder members 32 are preferably welded to the supplemental sills whereby they cooperate with the welded bases of the brackets for firmly securing the brackets to the supplemental sills.

Extending longitudinally on the chassis sills in the areas of the block-like supports 6 are relatively wide wooden members or boards 36 laid flat on the sills and having side edges projecting laterally from the sills, and plates 37 mounted on the boards receive the block-like members 6. U-bolts 38 embrace the sills and have ends 39 extending through the boards and plates 37 to receive nuts 40 for clamping and binding the boards and plates to the sills.

The plates 37 further comprise downbent flanges 41 overlying the outer side edges of the wooden members and upwardly bent vertical flanges 42 at their opposite edges extending substantially to the lower faces of the cross members 13 and preferably having outwardly bent flanges 43 which may be welded to said cross members 13.

Metal clips or strips 44 are preferably mounted on the inner side edges of the wooden members and may be welded to the vertical flanges 42 to provide a relatively rigid edge wall enclosure for the wooden member.

Bolts 45 are mounted transversely in the wooden members at intervals therealong and may extend through the depending flanges 41 and edge plates 44 to receive nuts 46, whereby the wooden members are reinforced and hazard of splitting of the same is minimized.

The blocks 6 above referred to comprise strip-like plates or base portions 47 positioned transversely of the plates 37 and preferably secured thereto by welding. The blocks further comprise vertical walls 48 adjacent the outer ends of the bases and adapted to be located laterally from and outside of the planes of the outer faces of the chassis sills and adjacent the outer edges of the wooden members 36 and plates 37. The walls 48 are provided with inwardly extending horizontal shelves 49 parallel with the bases and adapted to receive the lower edges of the supplemental sills and are preferably welded thereto.

The shelves are located in spaced relation with the upper edges of the vertical walls 49 to provide keeper-like portions 50 against which the outer vertical faces of the lower edge portions of the sills abut.

The blocks are further provided with vertical rib-like reinforcing and stiffening plates 51 integrally connected with the bases and the vertical walls, extending preferably on the center lines of the bases, the upper edges of the ribs being incut as at 52 for extending beneath the shelves to the vertical walls and to leave a point-like portion, and the outer vertical edges 53 being adapted to engage the vertical flanges 42 of the board covering plates 37.

The members for pivotally supporting the front end of the tank, namely the pivot bar member 7 and the socket 8 will now be more particularly described. The cross member 10 above referred to comprises a relatively wide plate portion 54 mounted on the upper edges of the chassis sills and a vertical flange 55 at its front edge, the socket member 9 comprising a base portion 56 having openings 57 to receive bolts 58 adapted for securing the socket member to the horizontal plate 54 on the median line of the chassis.

The plate portion 54 of the cross member is relatively wide to provide for a relatively long socket member having a recess or socket 59 comprising a cylindrical elongated opening having its axis mid-way between the chassis sills and opening upwardly through a relatively wide longitudinal slot 60 whereby a pivot bar 61 secured by a neck 62 to a horizontal plate portion 63 of the member 7 may be mounted in the socket and may be relatively freely movable therein to permit relative movement between the front end of the tank and the truck frame.

The member 8 further comprises an upstanding flange or plate portion 64 projecting upwardly from the horizontal plate 63 and a downwardly projecting vertical portion 65 comprising a stop wall against which the front end of the socket member 9 abuts, the pivot bar 61 projecting forwardly from said depending vertical wall.

The plate portion 63 of the member 8 is secured to a horizontal plate portion 66 of the transverse member 7 heretofore referred to as secured to the front ends of the supplemental sills, and the upwardly projecting flange 64 of the member 8 is secured to the vertical flange of said member 7.

The structure heretofore described permits the convenient mounting of other elements as will now be set forth.

Can racks 67 are preferably supported on brackets 68 comprising vertical laterally projecting web portions 69 having vertical inner edges abutting the outer faces of the supplemental sills, and angle brackets 70 welded to the webs have flanges 71 overlying the supplemental sills and secured thereto by bolts 72.

Metal straps 73 are preferably welded to the undersides of lateral flanges 74 of the brackets 70 and overlie the upper edges of the supplemental sills for engagement therewith by bolts 75, the straps preferably having downbent inner ends 76 adapted to anchor the brackets to the sills.

In apparatus constructed as described, the blocks having the inwardly extending shelves provide for mounting supplemental sills adjacent the outer edges of the chassis sills and therefore in relatively greatly spaced relation so that brackets supported by the supplemental sills may support saddles of relatively great length to provide extensive lateral support on two points for the rear end of the tank.

The transverse cross bars 13 fixed as described to the supplemental sills may thus be much longer than would be possible if the supplemental sills were mounted directly on the chassis sills. The inclined brackets mounted on the cross members having laterally outwardly extending arms thus project a substantial distance outwardly from the planes of the inner sides of the chassis sills and their strap-receiving pivot pins are located at a relatively high elevation above the cross members so that the saddle straps may depend to a level adjacent the cross members and the tank will be supported in a relatively low position and with its center of gravity closer to the frame of the truck than in ordinary structures.

Mounting of the tank on the saddle straps minimize road shocks and vibration transmitted through the vehicle frame from acting on the tank, since the pivoted ends of the straps, spaced from the tank, act as dampeners whereby the road shocks are prevented from further transmission toward the tank. Attention is also directed to the fact that by pivotally mounting the straps on their supports the straps are relieved of bending strains which may cause them to crystallize and break.

While movements of tanks are relatively slight, provisions to permit the same tend to minimize the strains on supporting elements and on the tank itself.

It is also apparent that while I have described the rear of the tank support on the longitudinal sills of the chassis and the front end of the tank as pivotally mounted on the cross member 10, it may be desirable in some instances to reverse this mounting and support the front end of the tank on the longitudinal sills and the rear end on a cross member extending across the rear end of the chassis similarly to said member 10.

What I claim and desire to secure by Letters Patent is:

1. In a truck tank mounting, in combination with a tank and parallel sills of a truck chassis, a pair of supplemental sills supported by said chassis sills, bolsters extending between the supplemental sills and spaced downwardly from the upper edges of said sills, brackets supported by said bolsters, saddle members pivotally connected with said brackets for supporting the tank, and a band having ends connected to said brackets for anchoring the tank to the saddle members.

2. In a truck tank mounting, in combination with a truck chassis and a tank, tank supporting means including a pair of longitudinal sills supported by the chassis, a cross member having ends secured to the sills, a pair of transversely spaced brackets mounted on the cross members and having ears secured to said sills, and means on the brackets for supporting the tank.

3. In a truck tank mounting, in combination with a truck chassis and a tank, tank supporting means including a pair of transversely spaced brackets supported by the chassis and having outwardly projecting arms, means pivotally secured to said arms for receiving the tank, and means connected to said arms for anchoring the tank to said receiving means.

4. In a truck tank mounting, spaced pairs of brackets supported on the truck chassis, flexible saddle straps for supporting the tank, loops on the ends of the straps, and pins carried by the brackets and extending through the horizontally positioned loops for pivotally securing the straps to the brackets.

5. In a truck tank mounting, in combination with a truck chassis, and a tank, tank supporting means including a pair of transversely spaced brackets supported by the chassis and having outwardly projecting arms, and flexible supporting means pivotally connected with said arms for pivotal adjustment in a vertical plane to support the tank from said brackets.

6. A truck tank mounting of the character described including a pair of transversely spaced brackets supported by the chassis and a saddle strap having looped ends mounted in the brackets for supporting the tank, each bracket having a looped inclined slot to receive an end of the strap, and pins mounted in said brackets across said slots and extending through said looped ends for pivotally attaching the ends of the strap to the brackets.

7. In a truck tank mounting, in combination with a truck chassis and a tank, a pair of brackets supported by the chassis and having outwardly laterally projecting arms provided with vertical openings, a saddle member having ends pivotally mounted in said brackets for supporting a portion of the tank, and a band having end members mounted in said openings for anchoring the tank to the saddle member.

8. In combination with a truck chassis including longitudinal sills, and a tank, a truck tank mounting including a pair of wooden members mounted on the sills, a pair of channels mounted edgewise on said wooden members, a cross beam having end edges secured to said channels, and means supported by the cross beam for supporting a portion of the tank.

9. In a device of the character described in combination with a support including parallel sills, a wooden member mounted on each sill, and having side edges projecting laterally therefrom, reinforcing members extending transversely through said wooden member, a plate mounted on said wooden member, a block mounted transversely on said plate and including a vertical wall positioned adjacent the outer edge of the wooden member and a shelf projecting inwardly from said wall, a supplemental sill mounted on said shelf, and means including a member secured to the sill for supporting the tank.

10. In a tank truck mounting, in combination with a truck chassis including longitudinal sills, and a tank, tank-supporting means including a bracket comprising an elongated base mounted transversely on one of the sills and secured thereto, a vertical wall at one end of said base, a vertical stiffening web extending longitudinally of the base, and a horizontal shelf projecting laterally from said vertical wall, and means supported by the shelf for supporting the tank.

11. In a device of the character described, in combination with a truck chassis including longitudinal sills, and a tank, means for supporting one end of the tank, a socket supported by the sills on the median line of the chassis adjacent the other end thereof, a cross member secured to the tank, a pivot member including a horizontal plate secured to the under side of said cross member and a vertical plate including an upwardly projecting portion secured to said cross member and a downwardly projecting portion, and a pivot member projecting from said downwardly projecting portion and receivable by said socket.

12. In combination with a truck chassis including longitudinal sills, and a tank or the like adapted to be mounted in the chassis, means at one end of the chassis for supporting one end of the tank, and pin and socket joint members secured respectively to the tank and the chassis at the other ends thereof including a member fixed to the tank having a depending flange forming a stop wall to engage the other of said members when said members are moved into joint-forming relation.

13. In combination with a truck chassis including longitudinal sills and a tank, a truck mounting including a pair of channels mounted edgewise on said sills, cross members positioned entirely within the horizontal confines of the channels and having ends secured to the webs of said channels, brackets supported by said cross members and secured to the channels, and tank-supporting means pivotally suspended from said brackets.

In testimony whereof I affix my signature.

OTTO N. GREDELL.